US009188342B2

(12) United States Patent
Melton et al.

(10) Patent No.: US 9,188,342 B2
(45) Date of Patent: Nov. 17, 2015

(54) SYSTEMS AND METHODS FOR DAMPENING COMBUSTOR DYNAMICS IN A MICROMIXER

(75) Inventors: Patrick Benedict Melton, Greenville, SC (US); James Harold Westmoreland, Greenville, SC (US)

(73) Assignee: General Electric Company, Schenectady, NY (US)

(*) Notice: Subject to any disclaimer, the term of this patent is extended or adjusted under 35 U.S.C. 154(b) by 871 days.

(21) Appl. No.: 13/425,950

(22) Filed: Mar. 21, 2012

(65) Prior Publication Data
US 2013/0247581 A1    Sep. 26, 2013

(51) Int. Cl.
*F23R 3/28* (2006.01)
*F02C 7/24* (2006.01)
*F23M 20/00* (2014.01)
*F23R 3/32* (2006.01)

(52) U.S. Cl.
CPC .............. *F23R 3/286* (2013.01); *F23M 20/005* (2015.01); *F02C 7/24* (2013.01); *F05D 2260/963* (2013.01); *F23R 3/32* (2013.01); *F23R 2900/00014* (2013.01); *F23R 2900/03044* (2013.01)

(58) Field of Classification Search
CPC ...... F23M 99/005; F23M 20/005; F02C 7/24; F02C 7/045; F23R 2900/00014; F23R 3/286; F23R 3/002; F23D 14/64; F23D 2210/00; F23D 14/02; F05D 2260/963
USPC ............................ 60/737–749, 725; 431/114
See application file for complete search history.

(56) References Cited

U.S. PATENT DOCUMENTS

| | | | | |
|---|---|---|---|---|
| 5,274,991 | A * | 1/1994 | Fitts ................................ | 60/800 |
| 6,351,947 | B1 * | 3/2002 | Keller et al. .................... | 60/725 |
| 6,981,358 | B2 * | 1/2006 | Bellucci et al. .............. | 60/39.17 |
| 7,413,053 | B2 * | 8/2008 | Wasif et al. .................... | 181/293 |
| 7,549,506 | B2 * | 6/2009 | Sattinger ........................ | 181/213 |
| 2005/0097890 | A1 * | 5/2005 | Ikeda et al. .................... | 60/748 |
| 2008/0245337 | A1 * | 10/2008 | Bandaru et al. ............... | 123/308 |
| 2008/0295519 | A1 * | 12/2008 | Park ............................... | 60/740 |
| 2010/0011769 | A1 * | 1/2010 | Gambacorta et al. .......... | 60/725 |
| 2011/0179795 | A1 * | 7/2011 | Johnson et al. ................ | 60/725 |

* cited by examiner

*Primary Examiner* — Phutthiwat Wongwian
*Assistant Examiner* — Alain Chau
(74) *Attorney, Agent, or Firm* — Sutherland Asbill & Brennan LLP

(57) ABSTRACT

Embodiments of the present application can provide systems and methods for dampening combustor dynamics. According to one embodiment, the system may include a micromixer. The system may also include at least one annular resonator disposed within the micromixer adjacent to a cap face plate or an impingement plate of the micromixer. The at least one annular resonator may include a first side including a number of holes forming a cold side hole pattern, a second side including a number of holes forming a hot side hole pattern, and a cavity substantially defined by the first side and the second side.

8 Claims, 5 Drawing Sheets

"SYSTEMS AND METHODS FOR DAMPENING COMBUSTOR DYNAMICS IN A MICROMIXER"

FIELD OF THE INVENTION

Embodiments of the present application relate generally to gas turbine engines and more particularly to systems and methods for dampening combustor dynamics.

BACKGROUND OF THE INVENTION

Gas turbines are generally operated at either a base load or at a part load. The load operation partly determines the amount of fuel consumption. Fluctuations in the rate of fuel consumption may create combustor dynamics, which may extend throughout the combustor. When the gas turbine is at base load, the peaks of the combustor dynamics are generally relatively low. However, during a transient mode switching or part load operation, the peaks of combustor dynamics may be high. Furthermore, screech dynamics, generally considered as one of the most destructive forms of dynamics, may get to higher levels during a part load operation. Accordingly, there is a need for systems and methods for dampening combustor dynamics.

BRIEF DESCRIPTION OF THE INVENTION

Some or all of the above needs and/or problems may be addressed by certain embodiments of the present application. According to one embodiment, there is disclosed a system for dampening combustor dynamics. The system includes a micromixer. The system also includes at least one annular resonator disposed within the micromixer adjacent to a cap face plate of the micromixer. The annular resonator includes a first side having a number of holes forming a cold side hole pattern, a second side having a number of holes forming a hot side hole pattern, and a cavity substantially defined by the first side and the second side.

According to another embodiment, there is disclosed another system for dampening combustor dynamics. The system includes a micromixer. The system also includes at least one annular resonator disposed within the micromixer adjacent to an impingment plate of the micromixer. The annular resonator includes a first side having a number of holes forming a cold side hole pattern, a second side having a number of holes forming a hot side hole pattern, and a cavity substantially defined by the first side and the second side.

Further, according to another embodiment, there is disclosed a method for dampening combustor dynamics. The method includes positioning at least one annular resonator within a micromixer. The annular resonator includes a first side having a number of holes forming a cold side hole pattern, a second side having a number of holes forming a hot side hole pattern, and a cavity substantially defined by the first side and the second side.

Other embodiments, aspects, and features of the invention will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION OF THE INVENTION

Illustrative embodiments will now be described more fully hereinafter with reference to the accompanying drawings, in which some, but not all embodiments are shown. The present application may be embodied in many different forms and should not be construed as limited to the embodiments set forth herein. Like numbers refer to like elements throughout.

Figure 1:
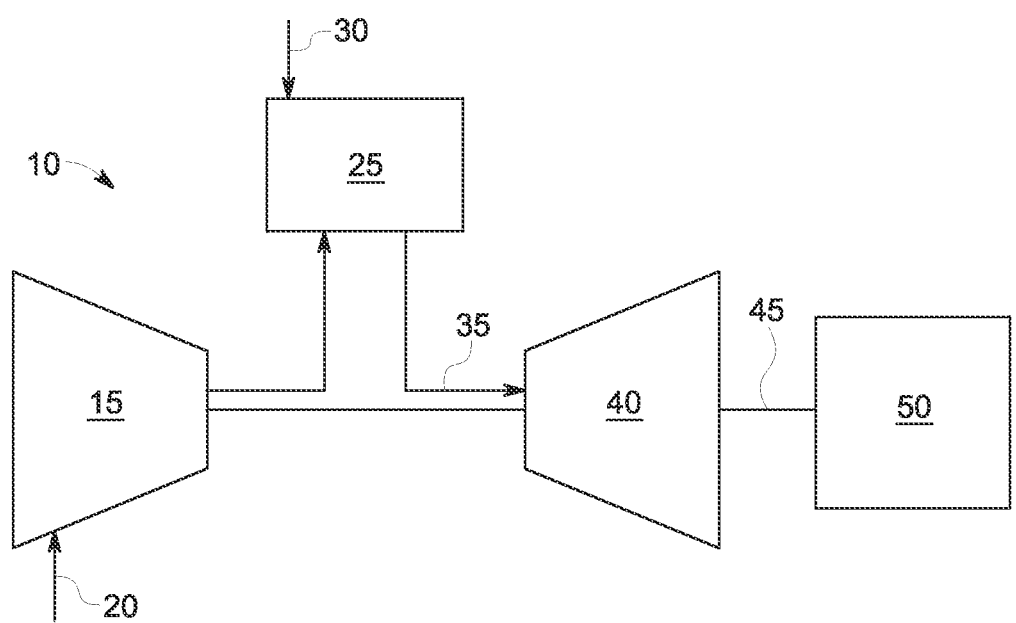
FIG. 1 is a schematic of an example diagram of a gas turbine engine with a compressor, a combustor, and a turbine, according to an embodiment.

Illustrative embodiments are directed to, among other things, micromixers for a combustor. FIG. 1 shows a schematic view of a gas turbine engine 10 as may be used herein. As is known, the gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components.

Other types of gas turbine engines also may be used herein. Multiple gas turbine engines, other types of turbines, and other types of power generation equipment also may be used herein together.

Figure 2:
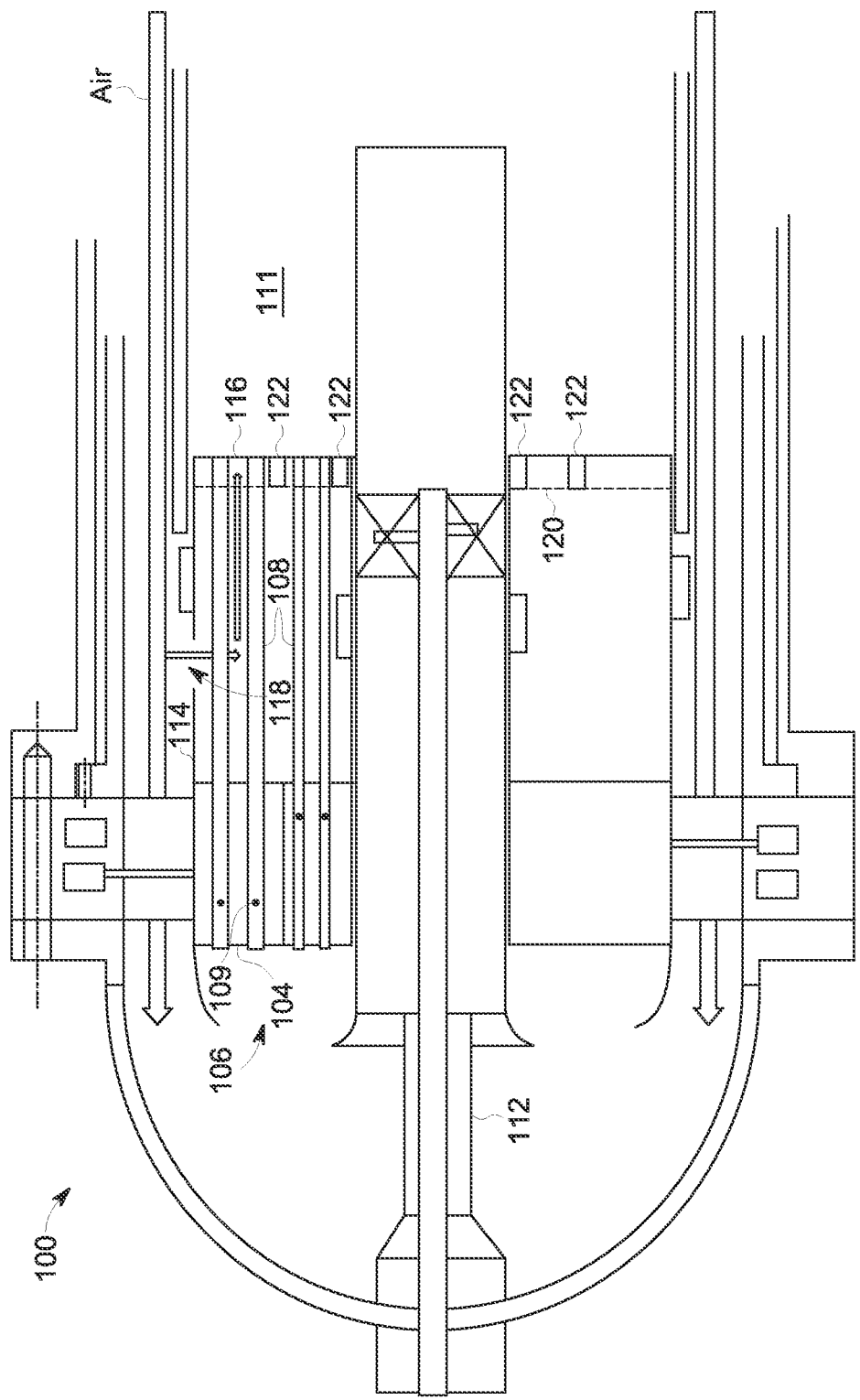
FIG. 2 is a schematic of an example diagram of a micromixer, according to an embodiment.

FIG. 2 depict a component of the combustor 25 in FIG. 1; specifically, a micromixer 100 or a portion thereof. The micromixer 100 may include a fuel plenum 104, an air intake 106, and numerous mixing tubes 108. In one embodiment, a fuel line 102 supplies fuel to the fuel plenum 104. The fuel exits the fuel plenum 104 and enters the mixing tubes 108 via one or more holes 109 in the mixing tubes 108. Air is directed into the mixing tubes 108 through the air intake 106 and mixes with the fuel to create an air/fuel mixture or working fluid. The air/fuel mixture exits the mixing tubes 108 and enters a combustion chamber 111. The micromixer 100 may also include a central fuel nozzle 112 for supplying fuel directly to the combustion chamber 111.

Still referring to FIG. 2, the mixing tubes 108 may include an end cap assembly 114 encompassing the mixing tubes 108 downstream of the fuel plenum 104. The end cap assembly 114 may include a cap face plate 116 disposed near the downstream end of the mixing tubes 108. A cooling air hole 118 may be located in the end cap assembly 114. The cooling air hole 118 directs air from the compressor into the end cap assembly 114 about the interstitial space between the mixing tubes 108. The diverted air cools the mixing tubes 108. The end cap assembly 114 may also include an impingement plate 120 disposed near the cap face plate 116. The impingement plate 120 impinges the cooling air flow in the end cap assembly 114.

One or more annular resonators 122 may be located within the end cap assembly 114 about the centerline of the micromixer 100. The annular resonators 122 may be attached to the cap face plate 116 and/or the impingement plate 120 within the end cap assembly 114.

Figure 3:
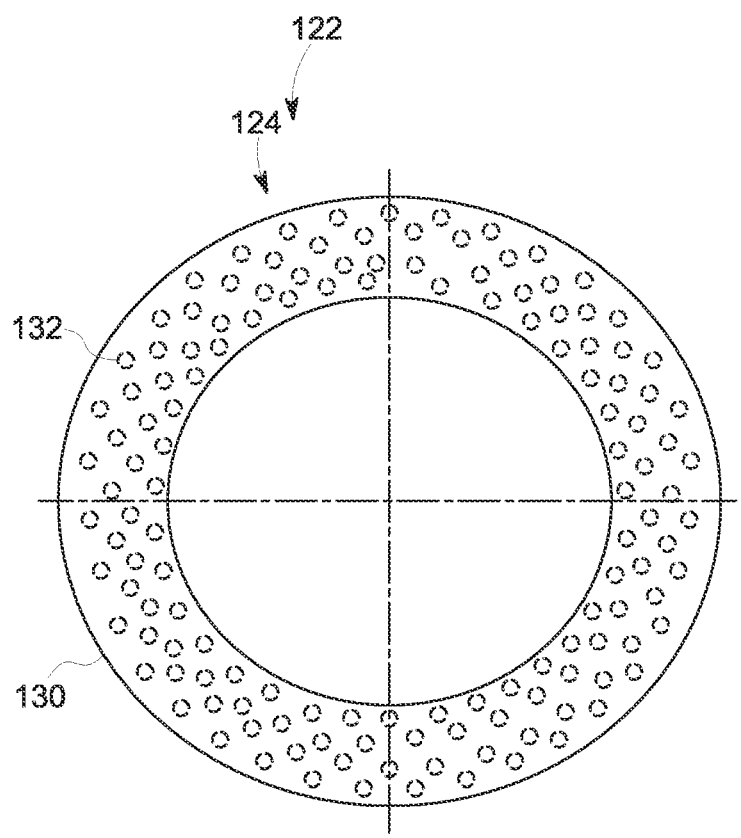
FIG. 3 is a schematic of an example diagram of an annular resonator, according to an embodiment.
Figure 4:
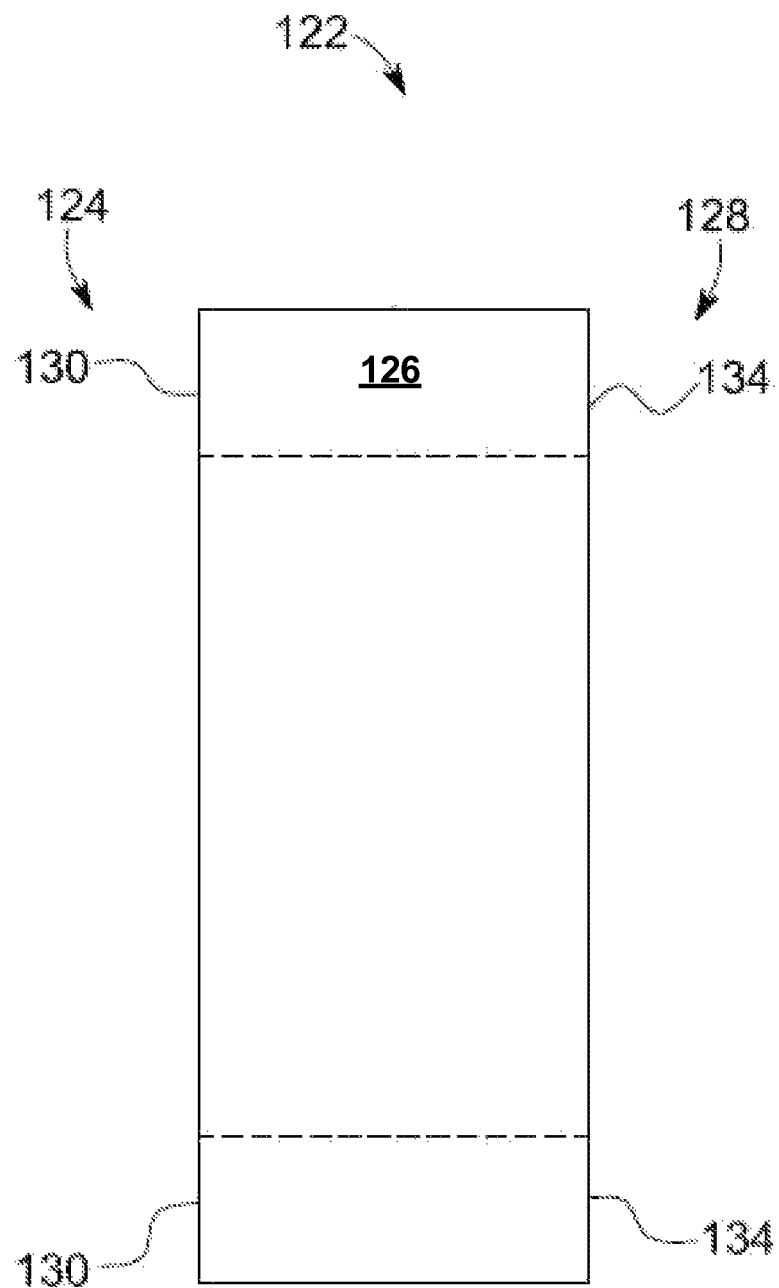
FIG. 4 is a schematic of an example diagram of an annular resonator, according to an embodiment.
Figure 5:
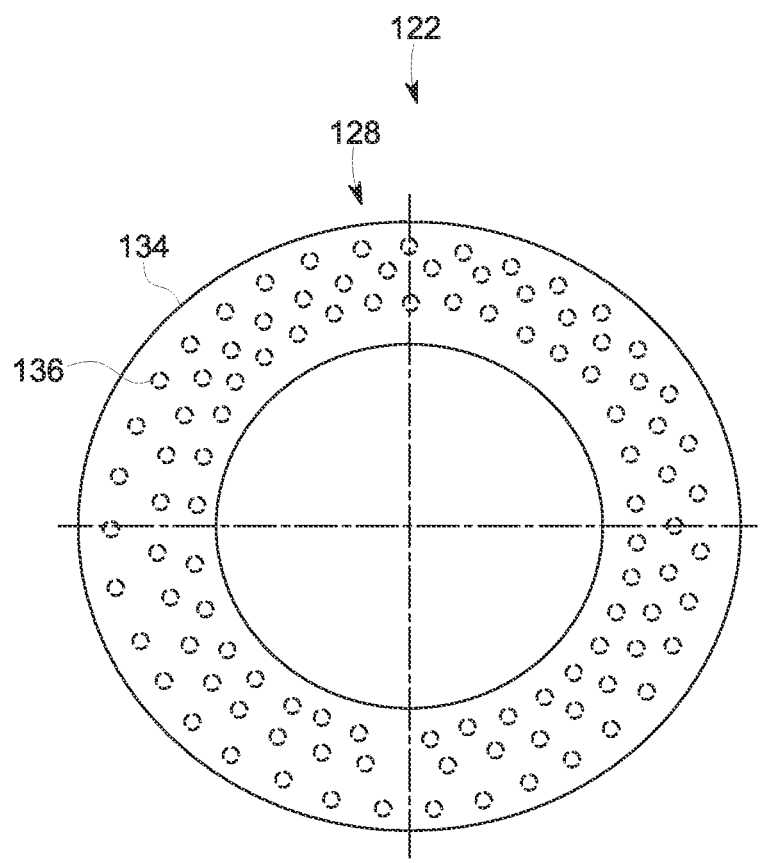
FIG. 5 is a schematic of an example diagram of an annular resonator, according to an embodiment.

As collectively depicted in FIGS. 3-5, the annular resonators 122 may each include a first side 124, a cavity 126, and a second side 128. The first side 124, the cavity 126, and second side 128 are joined to form the resonator 122. In certain illustrative embodiments, the annular resonator 122 may be disposed about the center fuel nozzle 112. In other illustrative embodiments, the annular resonator 122 may be disposed between co-annular bundles of mixing tubes 108.

The first side 124 may include a first side facing surface 130 and a cold side hole pattern 132. The first side 124 may form the upstream side of the annular resonator 122. The first side 124 may have a number of holes forming a cold side hole pattern 132. The cold side hole pattern 132 may be formed through a first side facing surface 130. The cold side hole pattern 132 allows for cooling air to enter the annular resonator 122. The cooling air cools the second side 128 and may prevent the working fluid from back flowing into the resonator 122.

The number of holes in the cold side hole pattern 132 may be configured and oriented such that cooling air flows through each hole on the cold side hole pattern 132. This may allow for the second side 128 to receive sufficient cooling air, which eventually effuses out of the second side facing surface 134.

The cavity 126 may be defined as the annular volume between the first side facing surface 130 and the second side facing surface 134. Typically, the cavity 126 is a closed volume. The fluid inertia of the working fluid passing through the hot side hole pattern 136 is reacted by the volumetric stiffness of the cavity 126, producing a resonance in the velocity of the working fluid through the hot side hole pattern 136. This flow oscillation generally has a well-defined natural frequency and provides an effective mechanism for absorbing acoustic energy. Therefore, the cavity 126 receives and absorbs the acoustic energy from the second side 128, dampening the screech dynamics.

The second side 128 may include a second side facing surface 134 and a hot side hole pattern 136. The second side 128 may form the downstream side of the resonator 122. The second side 128 receives portion of the working fluid. The working fluid is directed through the second side 128 and flows through to the cavity 126. The second side 128 may have a number of holes, which forms a hot side hole pattern 136. The hot side hole pattern 136 may be formed through a second side facing surface 134.

The thickness of the second side 128 generally functions as the throat length of the annular resonator 122. The throat length typically serves as an important parameter for configuring a resonator to dampening dynamics of a specific frequency. An embodiment of the present invention serves to dampening screech dynamics, which may occur at frequencies of 1000 Hz or higher.

The amount of holes in the hot side hole pattern 136 is configured and oriented such that a jet of working fluid that flows through each hole on the cold side hole pattern 132 is directed in a such a way that the jet impinges on the second side facing surface 134. In an embodiment, the number of holes forming the cold side hole pattern 132 may be less than the number of holes forming the hot side hole pattern 136. Furthermore, in an embodiment, the size of each hole among the cold side hole pattern 132 may be smaller than the size of each hole among the hot side hole pattern 136. The aforementioned features may ensure that adequate directing of the working fluid and damping of the combustor dynamics occurs.

In use, the resonator 122 may be tuned to remove a specific combustion dynamic frequency, i.e., the resonator 122 may be configured to remove a specific combustion dynamic frequency by varying the size and number of holes in the resonator. For example, combustion dynamic frequencies may range from about 1000 hz to about 4000 hz; furthermore, combustion dynamic frequencies may occur from any frequencies greater than about 1000 hz.

Co-assigned and co-pending patent application Ser. No. 11/732,143 to Bandaru et al., filed on Apr. 3, 2007, having a Pub. No. 2008/0245337, includes a resonator device and is hereby incorporated by reference.

The annular resonator 122 has been described in relation to the micromixer 100 depicted in FIG. 2. It will be appreciated, however, that the annular resonator may be disposed about the center line of any micromixer configuration, including, but not limited to, the segmented micromixer described in co-pending U.S. patent application Ser. No. 13/423,894, filed Mar. 19, 2012, which is hereby incorporated by reference. For example, the annular resonator described above may be disposed within the end cap assembly about the base nozzle structure of co-pending U.S. patent application Ser. No. 13/423,894.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A system for dampening combustor dynamics, comprising:
   a micromixer including;
   a plurality of mixing tubes disposed about a central fuel nozzle;
   a cap end assembly disposed about the plurality of mixing tubes and the central fuel nozzle and having a cap face plate and an impingement plate; and at least one annular resonator disposed within the micromixer and extending from the cap face plate to the impingement plate and encircling the central fuel nozzle, the at least one annular resonator comprising:
   a first side comprising a plurality of holes forming a cold side hole pattern;
   a second side comprising a plurality of holes forming a hot side hole pattern; and
   a cavity substantially defined by the first side and the second side.

2. The resonator of claim 1, wherein the at least one annular resonator is disposed between co-annular bundles of mixing tubes.

3. The resonator of claim 1, wherein the cold side hole pattern is oriented such that each of the plurality of holes in the cold side hole pattern allows for a jet of a cooling air to substantially impinge a second side facing surface.

4. The resonator of claim 1, wherein the plurality of holes forming the cold side hole pattern is less than the plurality of holes forming the hot side hole pattern.

5. The resonator of claim 1, wherein the size of the each hole among the cold side hole pattern is smaller than the size of each hole among the hot side hole pattern.

6. The resonator of claim 1, wherein the cold side hole pattern is configured to direct the cooling air through the cavity.

7. The resonator of claim 1, wherein the at least one annular resonator is configured to dampen combustion dynamic frequencies from about 1000 Hz or greater.

8. A method for dampening combustor dynamics, comprising:
  positioning at least one annular resonator within a micromixer, the micromixer comprising a plurality of mixing tubes disposed about a central fuel nozzle with a cap end assembly disposed about the plurality of mixing tubes and the central fuel nozzle, the cap end assembly comprising a cap face plate and an impingement plate, wherein the at least one annular resonator is disposed within the micromixer and extends from the cap face plate to the impingement plate and encircles the central fuel nozzle, the annular resonator comprising:
  a first side comprising a plurality of holes forming a cold side hole pattern;
  a second side comprising a plurality of holes forming a hot side hole pattern; and
  a cavity substantially defined by the first side and the second side; and tuning the at least one annular resonator to remove a specific combustion dynamic frequency.

* * * * *